(12) United States Patent
Lee et al.

(10) Patent No.: US 9,806,567 B2
(45) Date of Patent: Oct. 31, 2017

(54) WATERPROOF MOTOR (71) Applicant: DELTA ELECTRONICS, INC., Taoyuan County (TW)

(72) Inventors: Tsung-Yin Lee, Taoyuan County (TW); Po-Hao Yu, Taoyuan County (TW); Yi-Ching Chiu, Taoyuan County (TW); Cheng-Chieh Liang, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 382 days.

(21) Appl. No.: 14/718,891

(22) Filed: May 21, 2015

(65) Prior Publication Data
US 2015/0340923 A1 Nov. 26, 2015

Related U.S. Application Data (60) Provisional application No. 62/001,898, filed on May 22, 2014.

(51) Int. Cl.
| | |
|---|---|
| *H02K 11/00* | (2016.01) |
| *H02K 1/16* | (2006.01) |
| *F04D 17/08* | (2006.01) |
| *F04D 19/00* | (2006.01) |
| *F04D 29/053* | (2006.01) |
| *F04D 29/28* | (2006.01) |
| *F04D 29/32* | (2006.01) |

(Continued)

(52) U.S. Cl.
CPC ............... *H02K 1/16* (2013.01); *F04D 17/08* (2013.01); *F04D 19/002* (2013.01); *F04D 25/0613* (2013.01); *F04D 29/053* (2013.01); *F04D 29/281* (2013.01); *F04D 29/325* (2013.01); *F04D 29/329* (2013.01); *F04D 29/646* (2013.01); *H02K 1/2786* (2013.01); *H02K 1/30* (2013.01); *H02K 5/10* (2013.01); *H02K 5/225* (2013.01); *H02K 7/14* (2013.01); *H02K 9/06* (2013.01)

(58) Field of Classification Search
CPC ... H02K 11/0047; H02K 11/022; H02K 5/225
USPC ............................................... 310/88, 90, 71
See application file for complete search history.

(56) References Cited

U.S. PATENT DOCUMENTS

| | | | |
|---|---|---|---|
| 5,798,589 A * | 8/1998 | Ohi ........................ | F16C 23/04 310/90 |
| 6,987,336 B2 * | 1/2006 | Streng ..................... | H02K 5/24 310/51 |

(Continued)

*Primary Examiner* — Hanh Nguyen
(74) *Attorney, Agent, or Firm* — Hauptman Ham, LLP (57) ABSTRACT

A waterproof motor includes: a recess (15) and a shaft tube (11) disposed upright on one side (105) of a base (1); a waterproof cover (2) covering the one side (105) of the base (1) and having a through hole 21 correspondingly enclosing the shaft tube (11) and a protruding portion (22) correspondingly engaging the recess (15), a first space (18) formed between the waterproof cover (2) and the one side (105) of the base (1); a first circuit board (3) disposed inside the first space (18) and having a plurality of sensors (31, 32); a housing (6) having an opening (69) and connected to the other side (106) of the base (1); an insulation plate (7) covering the opening of the housing (6), a second space (68) opposite to the first space (18) formed between the insulation plate (7) and the housing (6).

14 Claims, 11 Drawing Sheets

(51) Int. Cl.
  *H02K 1/27*    (2006.01)
  *H02K 1/30*    (2006.01)
  *H02K 5/10*    (2006.01)
  *H02K 5/22*    (2006.01)
  *H02K 7/14*    (2006.01)
  *F04D 25/06*   (2006.01)
  *F04D 29/64*   (2006.01)
  *H02K 9/06*    (2006.01)

(56) References Cited

U.S. PATENT DOCUMENTS

| | | | |
|---|---|---|---|
| 9,676,408 B2 * | 6/2017 | Tominaga | B62D 5/0406 |
| 2012/0286630 A1 * | 11/2012 | Tomizawa | H02K 11/33 |
| | | | 310/68 D |
| 2013/0140964 A1 * | 6/2013 | Matsunaga | B62D 5/0403 |
| | | | 310/68 B |

* cited by examiner

WATERPROOF MOTOR

CROSS-REFERENCE TO RELATED APPLICATIONS

This patent application claims the benefit of U.S. Provisional Patent Application No. 62/001,898, filed May 22, 2014, which is incorporated by reference herein.

BACKGROUND

1. Technical Field

The present invention relates to a motor and, in particular, to a waterproof motor.

2. Related Art

With regard to the waterproof method for a motor, the conventional waterproof method is enclosing outside a stator (including a silicon steel plate, windings, and a circuit board) by a waterproof adhesive to prevent entry of outside moisture. Another conventional waterproof method is to add a waterproof structure which includes a protection lid and an airtight gasket connected with a base of the motor for waterproofing.

The waterproof effect of the waterproof adhesive is easily compromised by a manufacturing process. The waterproof effect by adding the waterproof structure is not affected by the manufacturing process, but when the motor is applied to a big size turbo blower, a first circuit board and a second circuit board are required by electronic components. The first circuit board needs to be as close to a stator as possible to facilitate sensing temperature and so forth. The second circuit board can be disposed in other position. The first and second circuit boards have to be electrically connected, to prevent short circuits, and to be insulated from each other except the portions of electrical connection.

In other words, the waterproof structure does not waterproof the first and second circuit boards. As a result, even if the first circuit board is protected from water, the second circuit board may still be affected by entry of outside moisture, which is a persistent problem to related industries.

Hence, the inventor of the present invention aims to offer a waterproof motor which can improve the above-mentioned defects.

BRIEF SUMMARY

It is an object of the present invention to provide a waterproof motor which can waterproof a first space and a second space, so as to protect a first and a second circuit board in the first and the second spaces, respectively, from being affected by outside moisture.

Accordingly, the present invention provides a waterproof motor, comprising: a base including a shaft tube and a recess, the shaft tube disposed upright on one side of the base, the recess surrounding the shaft tube; a waterproof cover covering the one side of the base, the waterproof cover including a through hole, correspondingly enclosing the shaft tube, and a protruding portion for corresponding engagement with the recess, a first space being formed between the waterproof cover and the one side of the base; a first circuit board disposed inside the first space and including a plurality of sensors; a housing including an opening and connected to the other side of the base; an insulation plate covering the opening of the housing, a second space corresponding to the first space being formed between the insulation plate and the housing; a second circuit board disposed in the second space; and a plurality of airtight gaskets including a first airtight gasket disposed between the waterproof cover and the one side of the base, a second airtight gasket disposed between the waterproof cover and the shaft tube, and a third airtight gasket disposed between the housing and the other side of the base.

Compared to conventional techniques, the present invention has the following effects: waterproofing the first space and the second space to protect the first and the second circuit boards in the first and second spaces from being affected by the outside moisture.

DETAILED DESCRIPTION

The following descriptions along with accompanied drawings are given to better explain the features and technical contents of the present invention. However, the following descriptions and the accompanied drawings are for reference and illustration only, and are not intended to limit the scope of the present invention.

Figure 1:
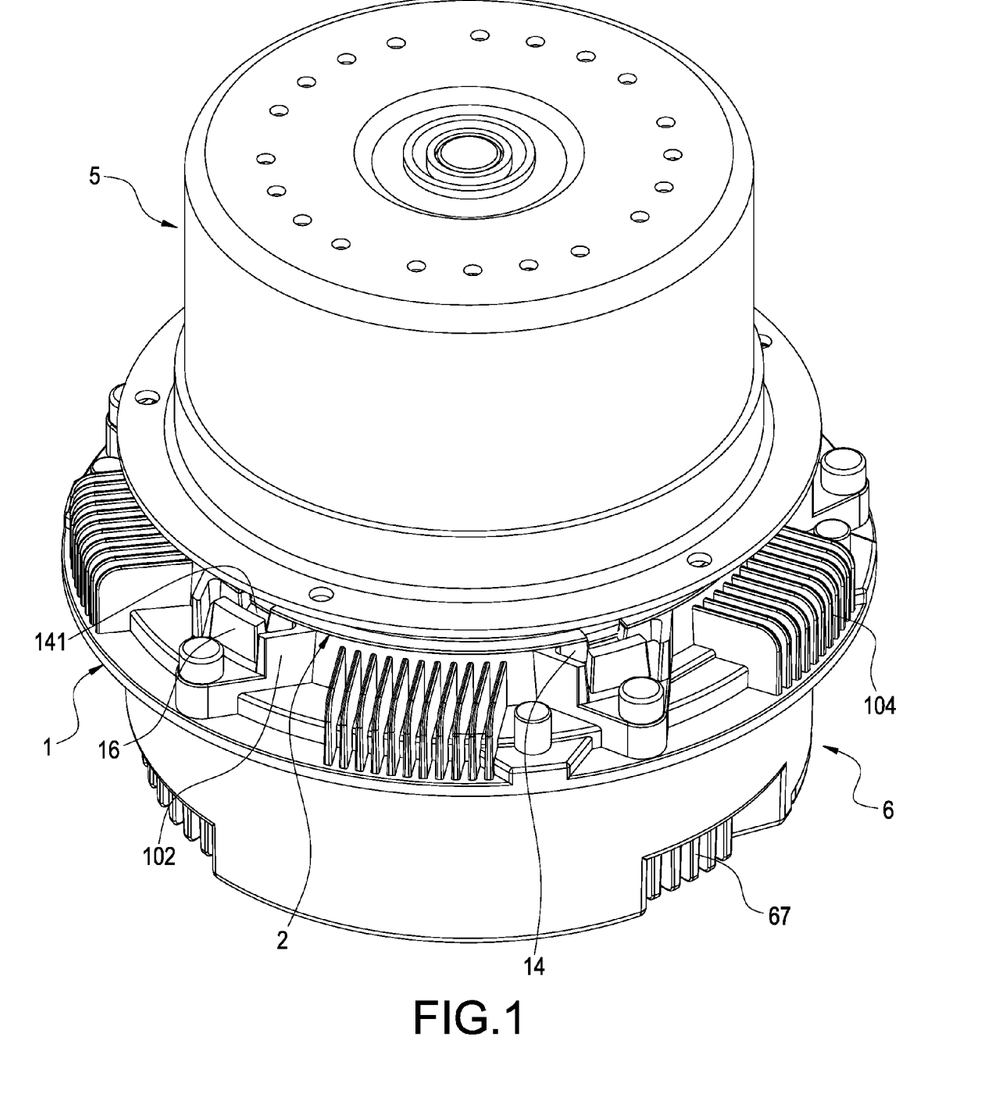
FIG. 1 is a perspective view of a waterproof motor of the present invention.
Figure 2:
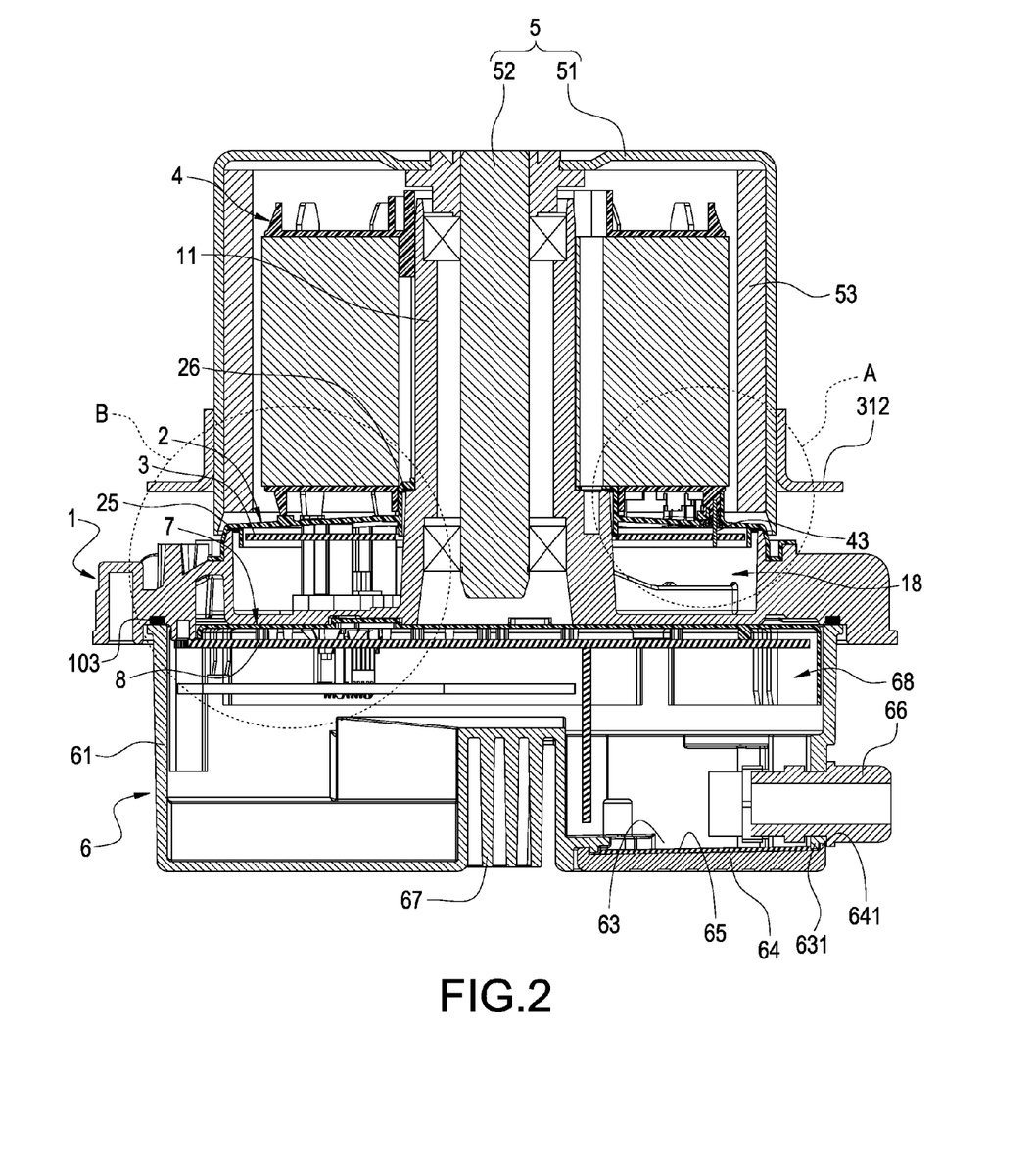
FIG. 2 is a sectional view of the waterproof motor of the present invention.

Referring to FIGS. 1 and 2, the present invention provides a waterproof motor which prevents outside moisture (or dust) from entering into the inside of the motor to affect a first circuit board 3 and a second circuit board 8. In the figures showing the waterproof motor of the present invention, it should be noted that a rotor 5 is not yet installed with fans.

Referring to FIGS. 1 and 2, the waterproof motor includes: a base 1, a waterproof cover 2, a first circuit board 3, a stator 4, a rotor 5, a housing 6, an insulation plate 7, a second circuit board 8, and a plurality of airtight gaskets.

Figure 5:
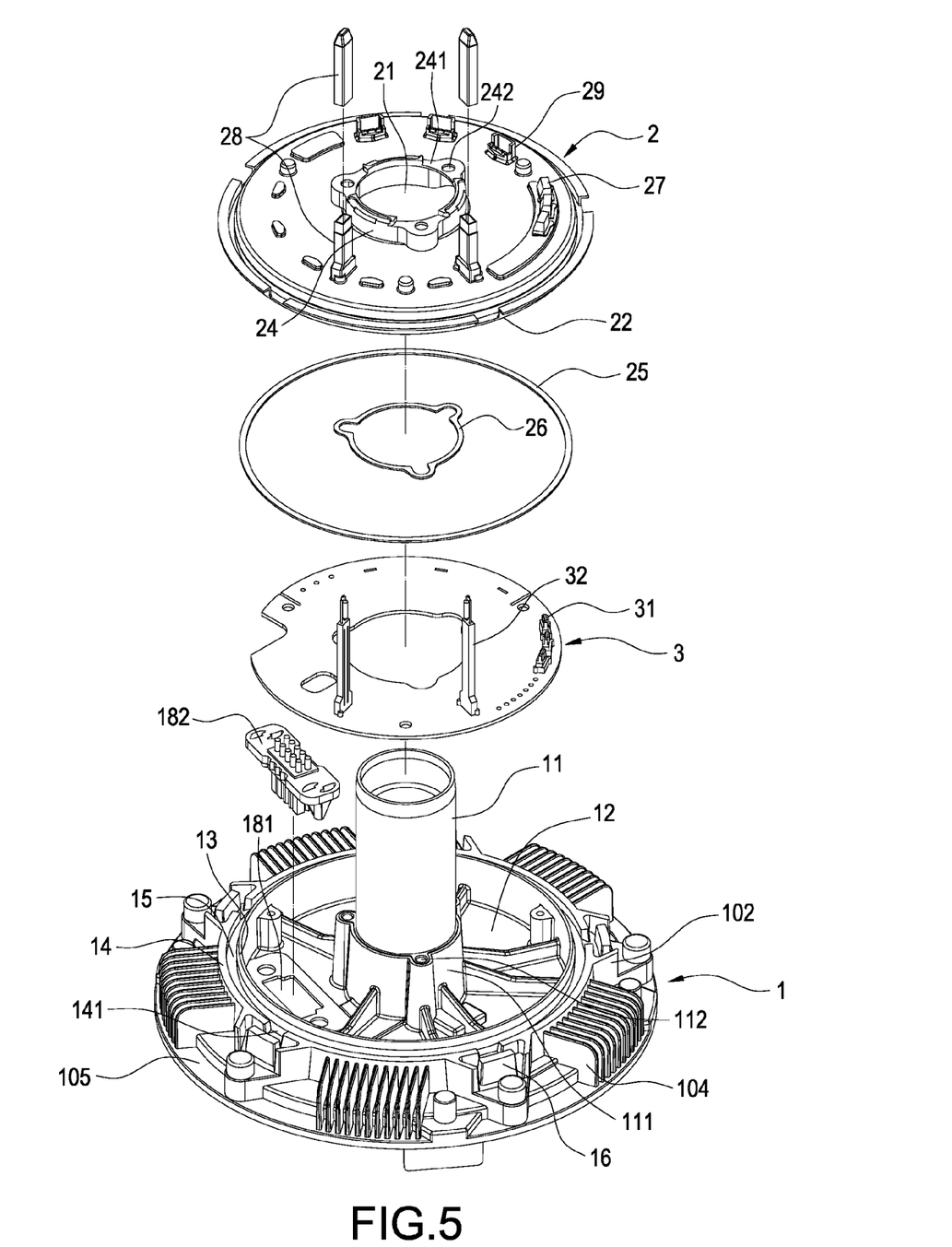
FIG. 5 is a perspective exploded view illustrating a first space of the waterproof motor of the present invention, wherein a stator and a rotor are omitted in this figure.
Figure 6:
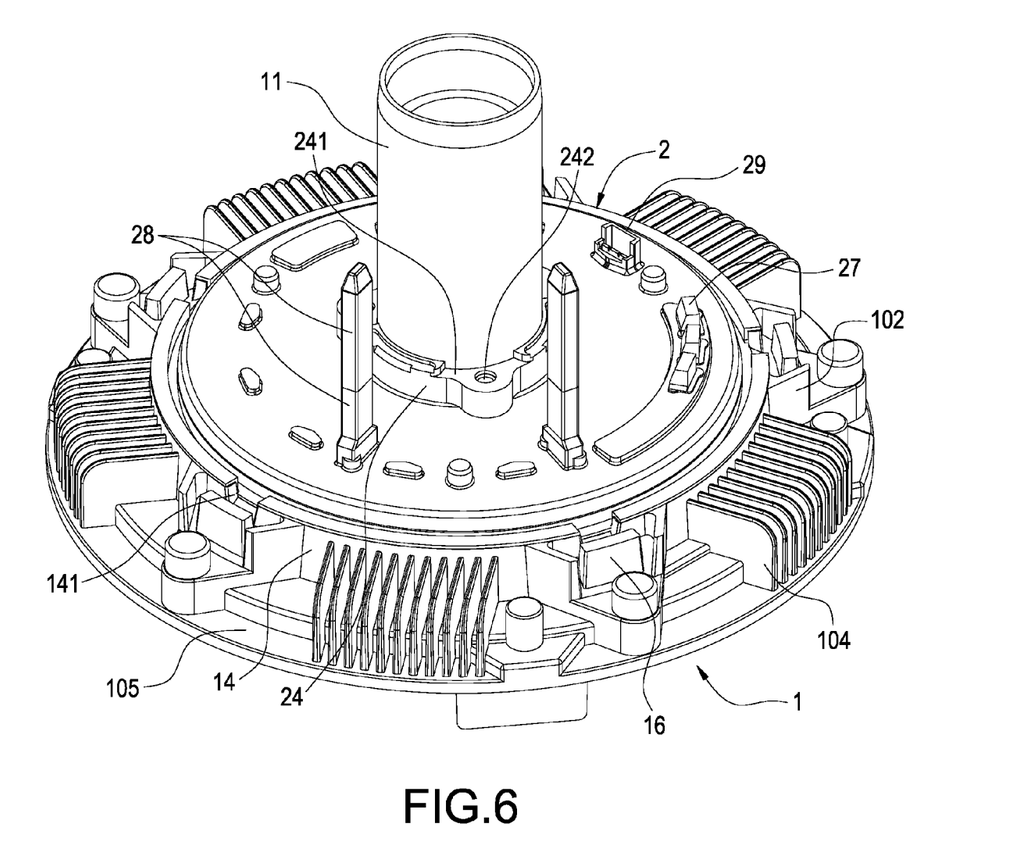
FIG. 6 is a perspective assembled view based on FIG. 5 of the waterproof motor of the present invention.
Figure 8:
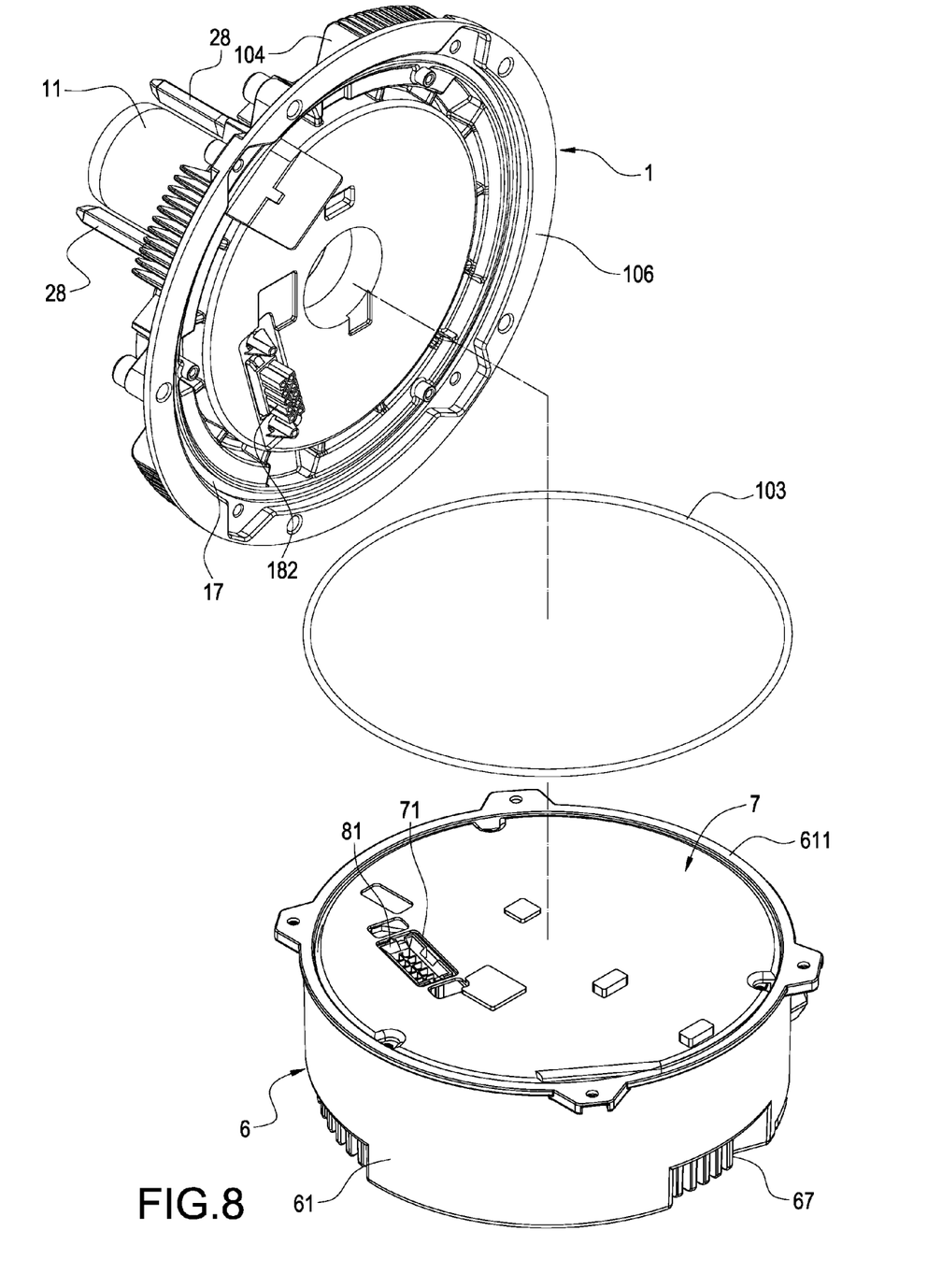
FIG. 8 is a perspective exploded view illustrating the relation between the first space and the second space of the waterproof motor of the present invention.

The base 1 includes one side 105 (shown in FIG. 5) and the other side 106 (shown in FIG. 8) opposite to each other. Referring to FIG. 5, a shaft tube 11 is hollow and disposed upright on the one side 105 of the base 1. The base 1 further includes a first recessed portion 12 and a recess 15. Referring to FIG. 8, an engagement trench 17 is formed on a periphery of the other side 106 of the base 1.

The recess 15 and the first recessed portion 12 can be formed in any types on the base 1. The following descriptions are provided to exemplify the present embodiment, but are not intended to limit the scope of the present invention.

Referring to FIG. 5, a first wall 13 and a second wall 14 are disposed upright on the one side 105 of the base 1 and spaced from each other. The first wall 13 surrounds the shaft tube 11 as a center. The second wall 14 surrounds the first wall 13. The recess 15 is formed between the first and second walls 13, 14. The first recessed portion 12 is formed between the first wall 133 and the shaft tube 11. The first wall 13 is higher than the second wall 14. A plurality of notches 141 are formed on the second wall 14 for draining out the moisture in the recess 15.

Figure 4:
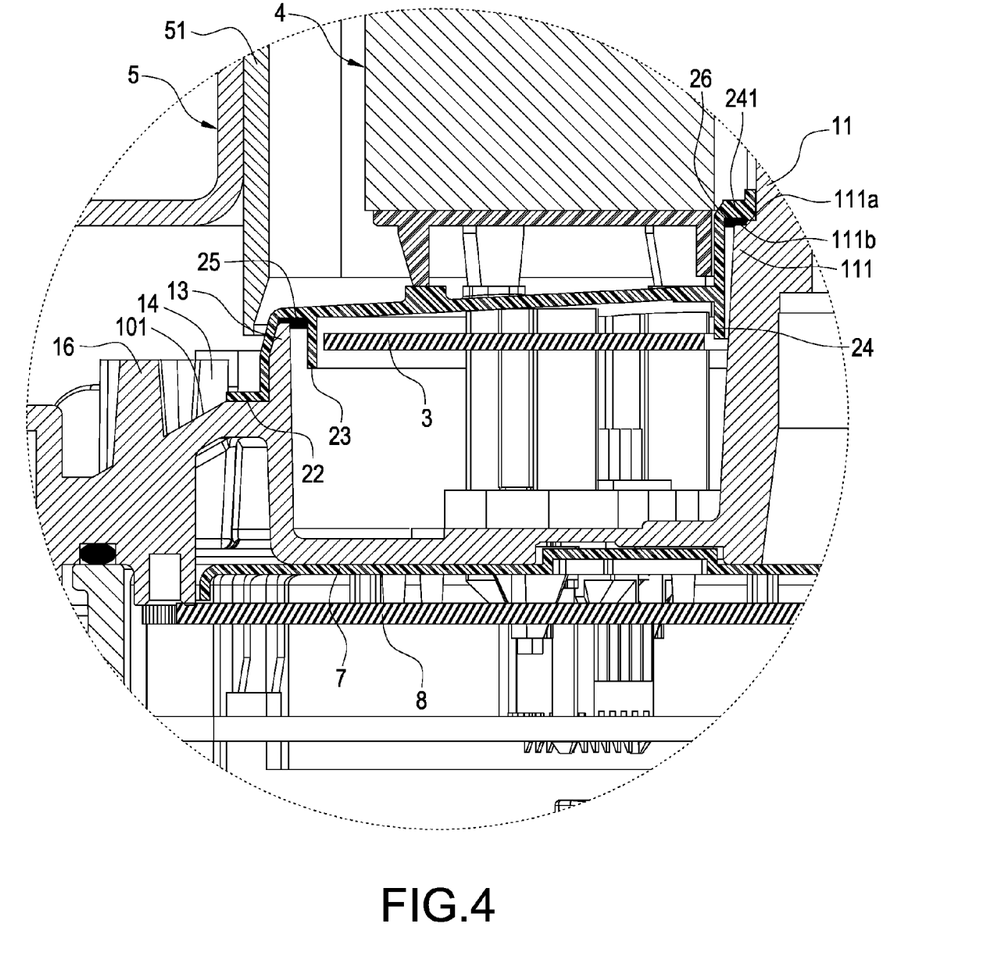
FIG. 4 is a partially enlarged view taken from a portion B in FIG. 2 thereof.

Furthermore, a flange 111 is disposed around an outer periphery of the shaft tube 11. Referring to FIG. 4, an upper step portion 111a and a lower step portion 111b are disposed on the flange 111 with different height positions, so that the flange 111 connects an abutting edge (not labelled) of the waterproof cover 2. The upper step portion 111a is disposed between the outer periphery of the shaft tube 11 and the lower step portion 111b.

Referring to FIG. 5, the flange 111 is connected to a plurality of cylindrical pillars (not labelled) so that a lower part of the shaft tube 11 can form a non-circular shape by use of the cylindrical pillars. A screw hole 112 is disposed on an upper end of each cylindrical pillar.

The waterproof cover 2 is provided for covering the one side 105 of the base 1, thereby forming a first space 18 (shown in FIGS. 2 and 3) between the waterproof cover 2 and the one side 105 of the base 1. A first airtight gasket 25 is disposed between the waterproof cover 2 and the one side of the base 1 to prevent the outside moisture from entering the first space 18 from where the waterproof cover 2 and the one side of the base 1 are connected together. A second airtight gasket 26 is disposed between the waterproof cover 2 and the shaft tube 11 to prevent the outside moisture from entering the first space 18 from where the waterproof cover 2 and the shaft tube 11 are connected together.

The waterproof cover 2 includes a through hole 21 disposed corresponding to the shaft tube 11 and includes a protruding portion 22 disposed corresponding to the recess 15. Therefore, when the waterproof cover 2 covers the one side 105 of the base 1, the through hole 21 of the waterproof cover 2 correspondingly encloses the shaft tube 11, and the protruding portion 22 of the waterproof cover 2 is correspondingly engaged in the recess 15.

The following descriptions about the waterproof cover 2 are provided to exemplify the present embodiment, but are not intended to limit the scope of the present invention.

The waterproof cover 2 further includes a third wall 23 (shown in FIG. 3) spaced from the protruding portion 22 and disposed adjacent to the same. The waterproof cover 2 also includes a fourth wall 24 (shown in FIGS. 3 and 4) disposed corresponding to the through hole 21. The fourth wall 24 protrudes between an outer side and an inner side of the waterproof cover 2 and forms a bend portion 241 correspondingly in contact against the aforesaid abutting edge of the flange 111. A plurality of corresponding holes 242 are formed on the bend portion 241. Each of the corresponding hole 242 is disposed corresponding to the screw holes 112 of the cylindrical pillars. Furthermore, a plurality of screw elements (not illustrated in the figures) can be inserted through the corresponding holes 242 on the bend portion 241 to be threadedly connected to and fixed in the screw holes 112 on the flange 111. The fourth wall 24 of the waterproof cover 2 has a shape corresponding to a shape of the flange 111 and the cylindrical pillars thereof. Therefore, after the fourth wall 24 enclosed with the flange 111 and the cylindrical pillars thereof, the waterproof cover 2 cannot axially rotate around the shaft tube 11, so that the rotation of the waterproof cover 2 can be prevented.

Figure 3:
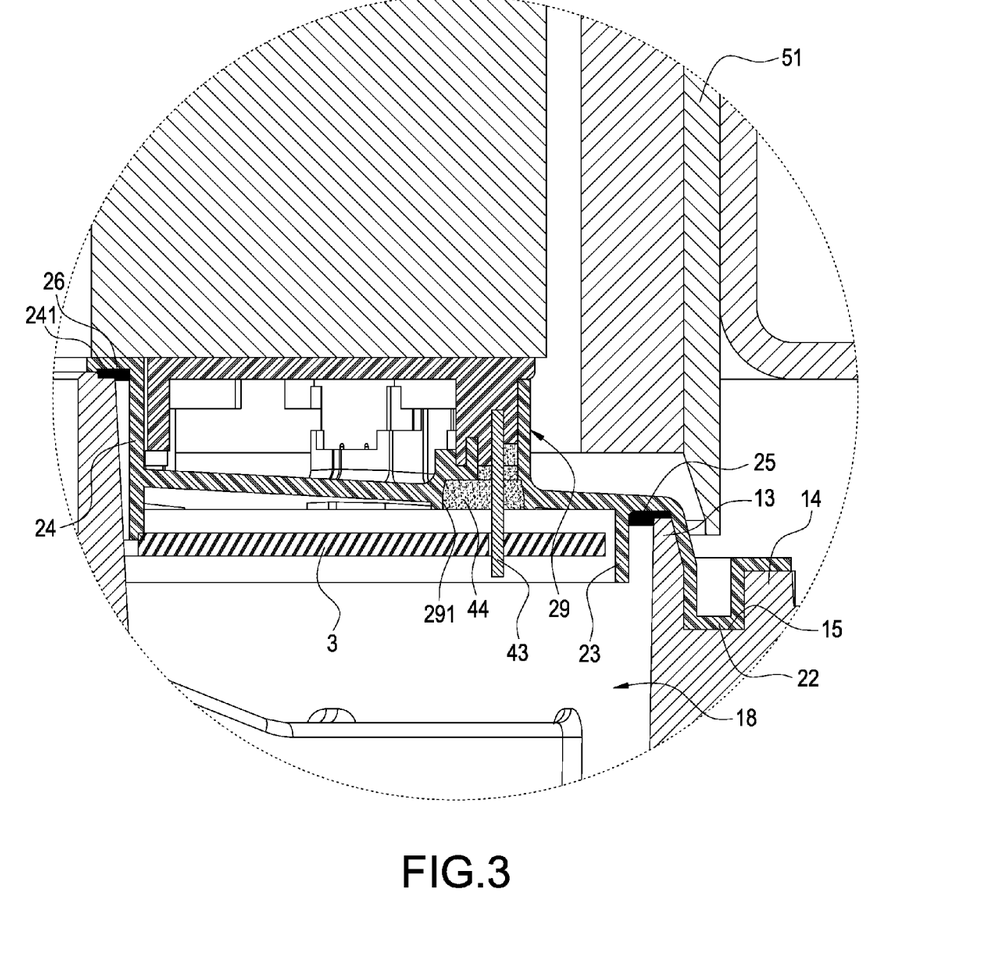
FIG. 3 is a partially enlarged view taken from a portion A in FIG. 2 thereof.

Referring to FIG. 3, the first airtight gasket 25 is disposed between the protruding portion 22 of the waterproof cover 2 and the third wall 23. The first wall 13 correspondingly extends into between the protruding portion 22 and the third wall 23 so that an upper end of the first wall 13 contacts against the first airtight gasket 25 to optimize the waterproof effect.

Referring to FIG. 4, the second airtight gasket 26 is disposed between the bend portion 241 of the fourth wall 24 and the flange 111 of the shaft tube 11. To be specific, the bend portion 241 contacts against the higher step portion 111a of the flange 111, and the second airtight gasket 26 is sandwiched between the bend portion 241 and the lower step portion 111b. Moreover, the distance between the bend portion 241 and the lower step portion 111b is less than the thickness of the second airtight gasket 26 before sandwiched and squeezed. Due to the elasticity of the airtight gasket itself, the second airtight gasket can be squeezed as flat as the aforesaid distance. Hence, the first and airtight gaskets 25, 26 surely can prevent the outside moisture from getting into the first space 18 and have the waterproof effect.

The first circuit board 3 is disposed in the first space 18 having aforesaid waterproof effect, so the first circuit board 3 is prevented from being effected by the outside moisture.

The first circuit board 3 is disposed with a plurality of sensors. The following descriptions are provided to exemplify the present embodiment, but are not intended to limit the scope of the present invention. The first circuit board 3 is disposed with a plurality of Hall effect sensors 31 for sensing magnetic fields and a plurality of temperature sensors 32 for sensing temperature. Since the Hall effect sensors 31 and the temperature sensors 32 should be disposed for sensing the magnetic fields of the rotor 5 and the temperature of the stator 4, respectively, the first circuit board 3 needs to be disposed as close to the stator 4 as possible. Referring to FIG. 2, the first circuit board 3 is disposed adjacent to the waterproof cover 2, that is, disposed between the third wall 23 and the fourth wall 24 of the waterproof cover 2 and located close to the stator 4 as possible. However, it causes that some electronic components on the first circuit board 3 are higher than the waterproof cover 2. To make the waterproof cover 2 still provide the waterproof effect for the electronic components, a plurality of cover bodies are disposed on the waterproof cover 2. For example, the cover body 27 correspondingly encloses the Hall effect sensor 31, and the cover body 28 correspondingly encloses the elongated temperature sensor 32. The cover body 28 can be a single-part (not illustrated) elongated cover body, or a two-part elongated body, and the form of the cover body 28 is not limited by the present invention. Thereby, both the Hall effect sensor 31 and the temperature sensor 32 deeply embedded in the stator 4 can be waterproofed by the waterproof cover 2.

Since the first circuit board 3 is disposed in the first space 18 having the waterproof effect, the outside moisture is prevented from entering the first space 18, and the first circuit board 3 is protected from being affected by the outside moisture.

Furthermore, the base 1 provides a plurality of baffles 16 each disposed corresponding to a respective one of the notches 141, and each baffle 16 is disposed at an outer side of a respective corresponding notch 141, so as to prevent the outside moisture from inversely flowing into the recess 15. In addition, the base 1 has an incline 101 inclined downwardly from each notch 141 to each corresponding baffle 16 to facilitate draining out moisture in the recess 15. Furthermore, a pair of side walls 102 are disposed between each notch 141 and each corresponding baffle 16, so as to guide the moisture in the recess 15 to flow out and to prevent the outside moisture from easily reversely flowing into the recess 15.

Referring to FIGS. 7 to 10, the housing 6 is connected to the other side 106 of the base 1. In other words, the housing 6 is disposed on an opposite side of the shaft tube 11. The housing 6 has an opening 69 and a contact rim 611 corresponding to the engagement trench 17. In the present embodiment, the housing 6 further includes a reservation opening 63, a movable lid 64, a seal 65, as an example. However, the present invention is not limited thereto.

The aforesaid contact rim 611 is formed on an upper edge of circumferential wall 61 of the housing 6. The opening 69 is enclosed by the housing 6 and the contact rim 611. A second recessed portion 62 is formed in the opening 69. Opposite to the opening 69 and on the other side of the housing is a closed portion (not labelled), and the closed portion of the housing 6 is disposed with the reservation opening 63.

The insulation plate 7 covers the opening 69 of the housing 6, thereby forming a second space 68 (see FIG. 9) opposite to the first space 18 between the insulation plate 7 and the housing 6.

A third airtight gasket 103 is disposed between the housing 6 and the other side 106 of the base 1. The following descriptions are provided to exemplify the present embodiment, but are not intended to limit the scope of the present invention. The third airtight gasket 103 is disposed in the engagement trench 17 of the base 1. Therefore, the third airtight gasket 103 can be in contact against the contact rim 611 of the housing 6, and thereby the second space 68 also has the waterproof effect to prevent the outside moisture from entering from where the housing 6 and the other side 106 of the base 1 are connected together.

Figure 7:
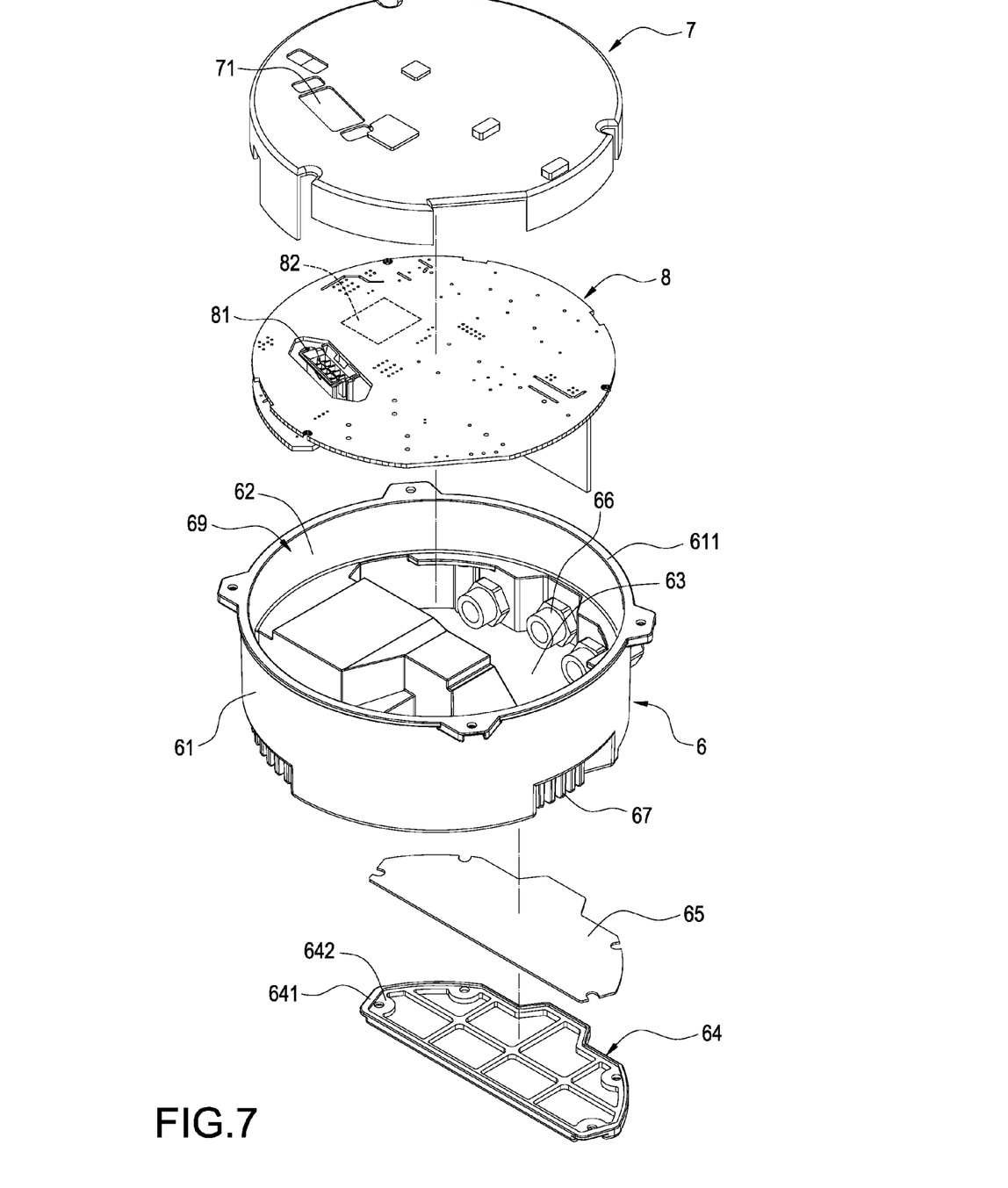
FIG. 7 is a perspective exploded view illustrating a second space of the waterproof motor of the present invention.

The second circuit board 8 is disposed in the second space 68. Since the outside moisture is prevented from entering the second space 68, the second circuit board 8 is also prevented from being affected by the moisture. The second circuit board 8 is disposed with at least one driving circuit 82 (as shown in FIG. 7), and the first circuit board 3 and the second circuit board 8 are electrically connected to each other.

The first circuit board 3 and the second circuit board 8 are electrically connected either by directly using various wires (not illustrated) or by means of a connector. The way in which the electrical connection is made is not limited by the present invention. The base 1 further includes an opening hole 181 disposed corresponding to the first recessed portion 12. The aforesaid wires (not illustrated) are electrically connected between the first circuit board 3 and the second circuit board 8 via the opening hole 181. As to the connector, please refer to FIGS. 5 and 8. First, a first connector 182 is disposed on the base 1 and corresponding to the opening hole 181, and the first connector 182 penetrates through the one side 105 and the other side 106 of the base. The first circuit board 3 is electrically connected to the first connector 182. Then, as shown in FIGS. 7 and 8, a second connector 81 is disposed on the second circuit board 8, and the second connector 81 is exposed from a cutout hole 71 of the insulation plate 7, and thereby when connecting the housing 6 to the other side 106 of the base 1, the first connector 182 and the second connector 81 are electrically connected to each other (as shown in FIG. 8).

Figure 11:
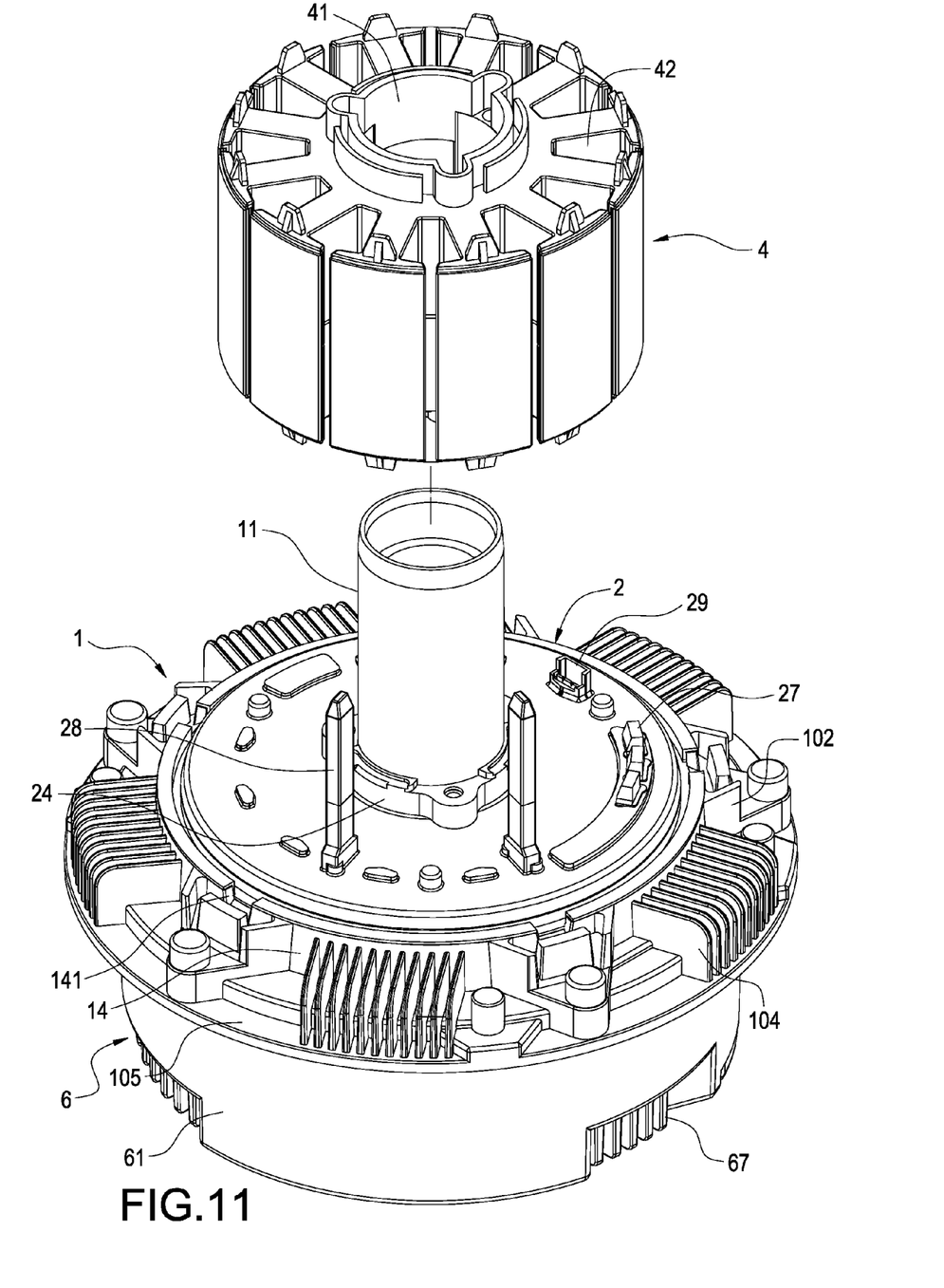
FIG. 11 is a perspective exploded view of the waterproof motor of the present invention after assembly based on FIG. 8.

Referring to FIG. 11, the stator 4 includes an insertion hole 41 in the center and a plurality of spaced compartments 42. The insertion hole 41 of the stator 4 encloses outside the shaft tube 11 of the base 1. The aforesaid screw elements (not illustrated) are inserted first through a plurality of positioning holes (not labelled) in the insertion hole 41 of the stator 4, then through corresponding holes (not labelled) of the bend portion 241, and at last are threadedly connected and fixed to the flange 111 of the shaft tube 11. Accordingly, the stator 4 is restricted by the non-circular shaped lower part of the shaft tube 11 from rotating, just like the waterproof cover 2.

As shown in FIGS. 2, 3, and 4, the rotor 5 includes a hub 51 and a shaft 52 connected to the hub 51. The shaft 52 is rotatably connected in the shaft tube 11 of the base 1, a plurality of magnetic elements 53 are disposed on an inner circumferential surface of the hub 51, and each of the magnetic elements 53 surrounds the stator 4.

Since the second circuit board 8 is disposed in the second space 68 having the waterproof effect, the outside moisture is prevented from entering the second space 68, and also prevented from affecting the second circuit board 8.

Figure 9:
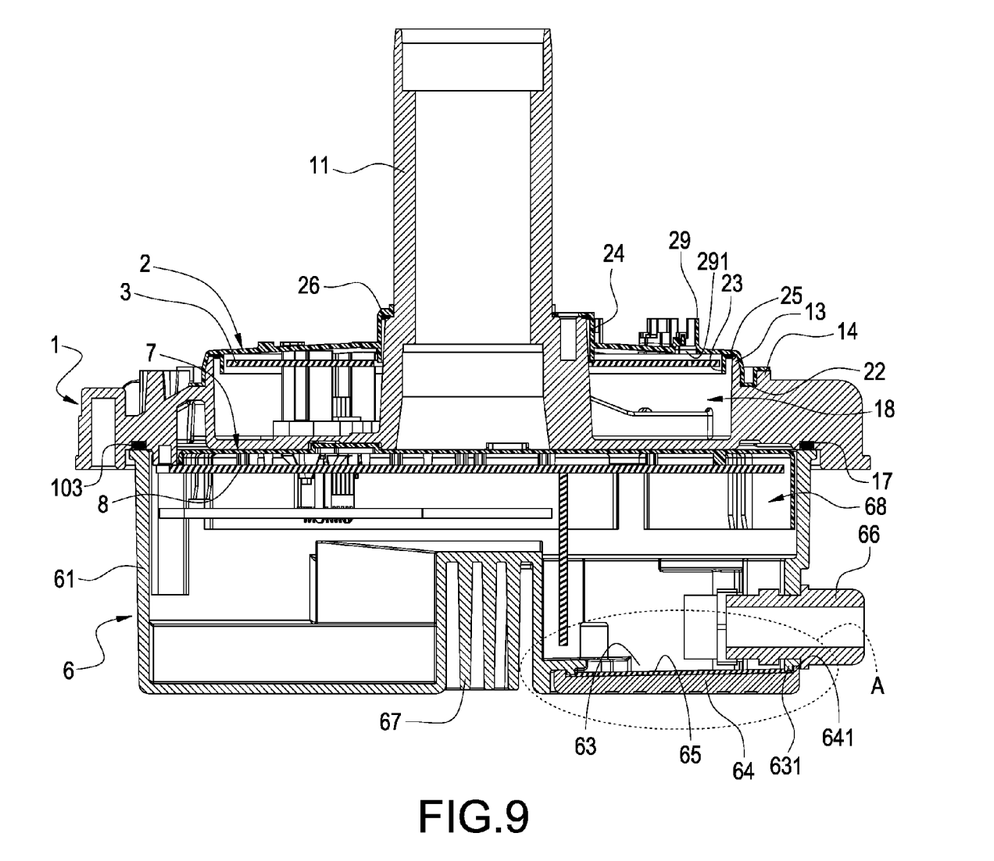
FIG. 9 is a sectional view of the waterproof motor of the present invention after assembly based on FIG. 8.
Figure 10:
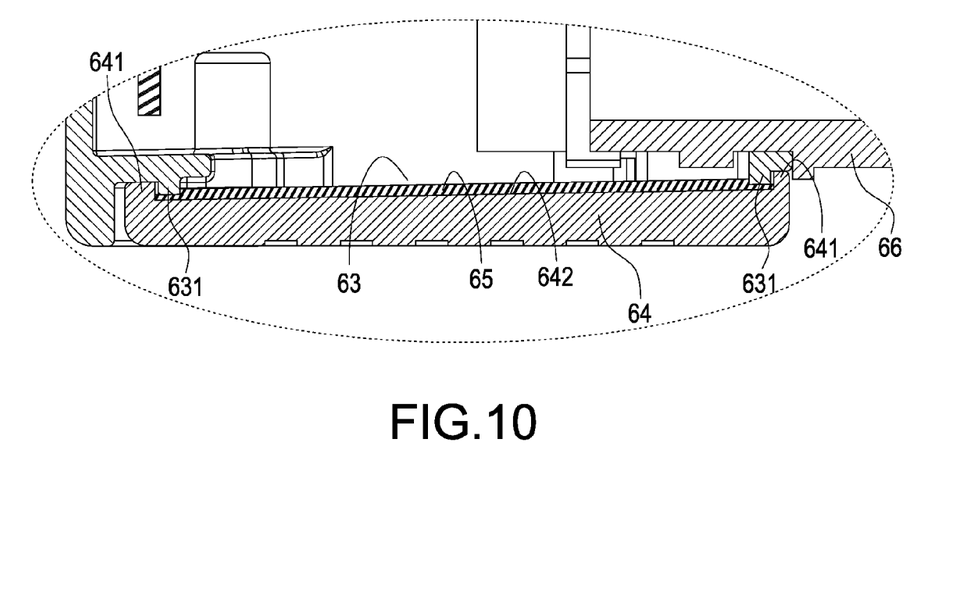
FIG. 10 is a partially enlarged view taken from the portion A in FIG. 9 of the waterproof motor of the present invention.

Referring to FIGS. 7, 9 and 10, the housing 6 is provided with an inner peripheral rib 631 surrounding around a periphery of the reservation opening 63. The movable lid 64 used to cover an abutting surface forms an outer peripheral rib 641 disposed corresponding to the inner peripheral rib 631, and the outer peripheral rib 641 and the inner peripheral rib 631 are apart from each other. A third recessed portion 642 is enclosed and formed by the movable lid 64 and the outer peripheral rib 641. A seal 65 is formed in the third recessed portion 642, and the seal 65 may be in a circular shape (not illustrated) or in a whole plate shape corresponding in shape to the third recessed portion 642. The shape of the seal 65 is not limited by the present invention. Since the seal 65 is correspondingly disposed between the movable lid 64 and the outer peripheral rib 641, when covering the movable lid 64, the inner peripheral rib 631 and the outer peripheral rib 641 are connected, and the seal 65 is sandwiched between an axial end surface of the inner peripheral rib 631 and the third recessed portion 642 to achieve the waterproof effect.

Referring to FIGS. 2, 7, and 9, the circumferential wall 61 of the housing 6 is connected with a plurality of wiring tube 66 for insertion and fixation of wires (not illustrated) electrically connected to the second circuit board 8, so that the user can adjust or maintain conveniently the waterproof motor of the present invention by opening the movable lid 64.

Furthermore, referring to FIGS. 3 and 5, in order to electrically connect the stator 4 to the first circuit board 3 with ease, the waterproof cover 2 is provided with a plurality of insertion bodies 29. An adhesive receiving space 291 is in an enlarged shape, is formed between each insertion body 29 and the waterproof cover 2, and is close to an inner side of the first circuit board 3. After each conductive pin 43 is electrically inserted into the first circuit board 3, a sealing adhesive 44 is injected into each adhesive receiving space 291 to seal each insertion body of the waterproof cover 2 for waterproofing. The insertion body 29 forms an insertion space (not labelled) outside the waterproof cover 2 and forms the aforesaid adhesive receiving space 291 inside the waterproof cover 2. The adhesive receiving space 291 is larger in area than the insertion space to facilitate adhesive injection.

Furthermore, referring to FIG. 1, to achieve a heat dissipation effect of the waterproof motor, the base 1 is disposed with a plurality of first heat dissipation members 104, the housing 6 is disposed with a plurality of second heat dissipation members 67, and each of the first heat dissipation members 104 and the second heat dissipation members 67 both can include a plurality of heat dissipation plates. However, the present invention is not limited thereto.

In summary, the waterproof motor of the present invention surely can achieve the anticipated objects and resolve the defects of the conventional techniques, and the present invention is novel and non-obvious. Hence, a request to patent the present invention is filed based on the patent laws. Examination is kindly requested, and allowance of the present patent application is solicited to protect the rights of the inventor.

It is to be understood that the above descriptions are merely preferable embodiments of the present invention and not intended to limit the scope of the present invention. Equivalent changes and modifications made in the spirit of the present invention are regarded as falling within the scope of the present invention.

What is claimed is:

1. A motor comprising:
   a base (1) including a shaft tube (11) and a recess (15), the shaft tube (11) disposed upright on one side (105) of the base (1), the recess (15) surrounding the shaft tube (11);
   a cover (2) covering the one side (105) of the base (1), the cover (2) including a through hole (21), correspondingly enclosing the shaft tube (11), and a protruding portion (22) for corresponding engagement with the recess (15), a first space (18) being formed between the cover (2) and the one side (105) of the base (1);
   a first circuit board (3) disposed in the first space (18) and including a plurality of sensors (31, 32);
   a housing (6) including an opening (69) and connected to the other side (106) of the base (1);
   an insulation plate (7) covering the opening of the housing (6), a second space (68) opposite to the first space (18) being formed between the insulation plate (7) and the housing (6);
   a second circuit board (8) disposed in the second space (68); and
   a plurality of airtight gaskets including a first airtight gasket (25) disposed between the cover (2) and the one side (105) of the base (1), a second airtight gasket (26) disposed between the cover (2) and the shaft tube (11), and a third airtight gasket (103) disposed between the housing (6) and the other side (106) of the base (1).

2. The motor of claim 1, wherein the base (1) includes a first wall (13) surrounding the shaft tube (11) and includes a second wall (14) spaced from the first wall (13) and surrounds the same; the cover (2) further includes a third wall (23) spaced from the protruding portion (22) and disposed close to the same; the first airtight gasket (25) disposed between the protruding portion (22) of the cover (2) and the third wall (23); and the first wall (13) extends to between the protruding portion (22) of the cover (2) and the third wall (23) and contacts against the first airtight gasket (25).

3. The motor of claim 2, wherein the cover (2) further includes a fourth wall (24) disposed corresponding to the through hole (21), a flange (111) is disposed around an outer periphery of the shaft tube (11), a bend portion (241) is disposed corresponding to the flange (111), and the second airtight gasket (26) is disposed between the bend portion (241) of the fourth wall (24) and the flange (111) of the shaft tube (11).

4. The motor of claim 3, wherein an upper step portion (111a) and a lower step portion (111b) which are in different height positions are disposed on an abutting edge between the flange (111) and the bend portion (241), the bend portion (241) contacts against the upper step portion (111a) of the flange (111), and the second airtight gasket (26) is sandwiched between the bend portion (241) and the lower step portion (111b) of the flange (111).

5. The motor of claim 3, wherein the first circuit board (3) is disposed between the third wall (23) and the fourth wall (24).

6. The motor of claim 2, wherein the second wall (14) includes a plurality of notches (141), the base (1) is disposed with a plurality of baffles (16) each corresponding to a respective one of the notches (141) to prevent outside moisture from entering the recess (15), and the base (1) has an incline (101) between each notch (141) and each corresponding baffle (16) to facilitate water draining.

7. The motor of claim 1, wherein an engagement trench (17) is surroundingly formed on the other side (106) of the base (1), the housing (6) includes a contact rim (611) corresponding to the engagement trench (17), the third airtight gasket (103) is disposed in the engagement trench (17) of the base (1), and the third airtight gasket (103) is in contact against the contact rim (611) of the housing (6).

8. The motor of claim 1, further comprising a stator (4) and a rotor (5), the stator (4) enclosing outside the shaft tube (11) of the base (1), the rotor (5) including a hub (51) and a shaft (52) connected to the hub (51), the shaft (52) being rotatably connected in the shaft tube (11), a plurality of magnetic elements (53) being disposed on an inner circumferential surface of the hub (51), each of the magnetic elements (53) surrounding the stator (4).

9. The motor of claim 8, wherein the cover (2) further includes a plurality of cover bodies (27, 28), and each of the sensors (e.g. 31, 32) is enclosed by each of the cover bodies (27, 28) for waterproofing.

10. The motor of claim 9, wherein each of the sensors includes a plurality of hall effect sensors (31) and a plurality of temperature sensors (32), and each of the temperature sensors (32) is embedded in the stator (4).

11. The motor of claim 1, wherein the first circuit board (3) and the second circuit board (8) are electrically connected to each other.

12. The motor of claim 11, wherein the base (1) includes an opening hole (181) disposed corresponding to the first space (18), the base (1) includes a first connector (182) disposed corresponding to the opening hole (181), the first circuit board (3) is electrically connected to the first connector (182), the second circuit board (8) is disposed with a second connector (81), the first connector (182) is exposed from the other side (106) of the base (1), the second connector is exposed from the insulation plate (7), and the first connector (182) and the second connector (81) are connected to each other.

13. The motor of claim 1, wherein the housing (6) further includes a reservation opening (63), the housing (6) includes a movable lid (64) correspondingly covering the reservation opening (63), the housing (6) includes a seal (65) disposed between the reservation opening (63) and the movable lid (64).

14. The motor of claim 1, wherein the second circuit board (8) includes at least one driving circuit (82).

* * * * *